(12) United States Patent
Olabi et al.

(10) Patent No.: US 9,444,117 B2
(45) Date of Patent: Sep. 13, 2016

(54) PROTON EXCHANGE MEMBRANE FUEL CELL WITH OPEN PORE CELLULAR FOAM

(71) Applicant: Dublin City University, Dublin (IE)

(72) Inventors: Abdul Ghani Olabi, Dublin (IE); James Gerard Carton, Wexford (IE)

(73) Assignee: Dublin City University, Dublin (IE)

( * ) Notice: Subject to any disclaimer, the term of this patent is extended or adjusted under 35 U.S.C. 154(b) by 0 days.

(21) Appl. No.: 14/426,653

(22) PCT Filed: Sep. 6, 2013

(86) PCT No.: PCT/EP2013/068453
§ 371 (c)(1),
(2) Date: Mar. 6, 2015

(87) PCT Pub. No.: WO2014/037494
PCT Pub. Date: Mar. 13, 2014

(65) Prior Publication Data
US 2015/0263373 A1    Sep. 17, 2015

(30) Foreign Application Priority Data

Sep. 7, 2012    (GB) .................... 1216030.5

(51) Int. Cl.
| | |
|---|---|
| H01M 8/0232 | (2016.01) |
| H01M 8/04029 | (2016.01) |
| H01M 8/0258 | (2016.01) |
| H01M 8/24 | (2016.01) |
| H01M 4/86 | (2006.01) |
| H01M 8/02 | (2016.01) |
| C25B 9/18 | (2006.01) |

(52) U.S. Cl.
CPC .............. *H01M 8/2485* (2013.01); *C25B 9/18* (2013.01); *H01M 4/8605* (2013.01); *H01M 8/0232* (2013.01); *H01M 8/241* (2013.01); *Y02E 60/50* (2013.01); *Y02E 60/521* (2013.01)

(58) Field of Classification Search
None
See application file for complete search history.

(56) References Cited

U.S. PATENT DOCUMENTS

| | | | |
|---|---|---|---|
| 5,584,976 A | 12/1996 | Nishiki et al. | |
| 6,531,238 B1 | 3/2003 | King | |
| 2003/0124411 A1* | 7/2003 | Cisar ............... | H01M 4/8605 429/434 |
| 2004/0043285 A1 | 3/2004 | Nagoshi et al. | |
| 2005/0208366 A1* | 9/2005 | Rohwer ............. | H01M 4/8636 429/413 |

FOREIGN PATENT DOCUMENTS

| | | |
|---|---|---|
| EP | 0495512 | 7/1992 |
| EP | 1184924 | 3/2002 |
| WO | 9833221 | 12/1998 |
| WO | 0049671 | 8/2000 |
| WO | 0069003 | 11/2000 |
| WO | 0227815 | 4/2002 |
| WO | 0227839 | 4/2002 |

\* cited by examiner

*Primary Examiner* — Yoshitoshi Takeuchi
(74) *Attorney, Agent, or Firm* — Schwabe, Williamson & Wyatt, P.C.

(57) ABSTRACT

The present application relates generally to electrochemical devices, for example proton exchange membrane fuel cells or electrolysers. The present application employs a metal foam as a common fluid flow manifold between adjacent fuel cells and avoids the use of expensive metal end plates. The common fluid flow manifold is provided by the metal foam with no separator/gas barrier provided.

27 Claims, 4 Drawing Sheets

PROTON EXCHANGE MEMBRANE FUEL CELL WITH OPEN PORE CELLULAR FOAM

CROSS REFERENCE TO RELATED APPLICATION

The present application is a national phase entry under 35 U.S.C. §371 of International Application No. PCT/EP2013/068453, filed Sep. 6, 2013, entitled "A PROTON EXCHANGE MEMBRANE FUEL CELL WITH OPEN PORE CELLULAR FOAM," which designated, among the various States, the United States of America, and which is hereby incorporated by reference.

FIELD

The present application relates generally to electrochemical devices and more specifically to proton exchange membrane fuel cells or electrolysers. The present embodiments relate to specific materials, construction, layout and configuration of bipolar fluid flow manifolds or flow plates for simpler design, more efficient operation and lighter device.

BACKGROUND

A fuel cell is a device that converts the chemical energy from a fuel into electricity through a chemical reaction with oxygen or another oxidizing agent. Hydrogen is the most common fuel, but hydrocarbons such as natural gas and alcohols such as methanol can be used in specific applications. Fuel cells are different from batteries in that they require a constant source of fuel and oxidant to operate, but they can produce electricity continually for as long as these inputs are supplied.

There are many types of fuel cells, but they all consist of an anode (negative side), a cathode (positive side) and an electrolyte that allows ions to move between the two sides of the fuel cell. Catalysts are required to aid the release of ions and electrons. Electrons are drawn from the anode to the cathode through an external circuit, producing direct current electricity. The resulting electricity may thus be used to power a suitable electronic device.

As the voltage produced by a fuel cell is relatively low, it is common to arrange existing conventional fuel cells in series to produce a higher voltage output. To achieve this in a convenient manner, the cells are typically arranged in a stack. Hydrogen and oxygen are provided to each cell in the stack and the water by product removed from each cell.

The present application is directed generally at a type of fuel cell referred to generally as Proton Exchange Membrane (PEM) fuel cell. The present application can also be directed generally to electrolysers. A PEM fuel cell comprises a Membrane Electrode Assembly (MEA) 1, comprising of a proton exchange membrane 2 sandwiched between two electrodes (the anode 4 and the cathode 6), which contain the electro catalyst 8, 10 as shown generally in FIG. 1. Attached to each electrode is a Gas Diffusion Layer (GDL) and at each end a flow plate is provided (not shown). The flow plate which is traditionally solid material coated in a corrosive resistant, conducting material has many functions within the PEM fuel cell but its primary aim is to act as a manifold to supply fuel and oxidant gases to the MEA reactive sites and this makes the flow plate a vital component for the PEM fuel cell.

The flow plate acts as a gas distributor and allows for the supply and control of fuel and oxidant. At the same time it allows for an exit for waste water through the open channels and waste heat through the conductive flow plate material. Machined Channels are provided in the flow plate in order to reduce gas transport losses. The flow plate may also house cooling tubes to manage the temperature of the fuel cell. However the necessity of an intricate design has an effect on the cost of the fuel cell; compatible materials and machining costs escalate prices.

The overall efficiency of the fuel cell depends extensively on the performance of the flow plate used. Using solid metal or carbon or graphite for the flow plate is both expensive and at the same time adds considerable weight. As a result, several types of materials have been employed for flow plate construction including, for example, polymer-coated metal sheet, electro & flexible graphite, carbon-carbon composite and thin metallic sheets.

A significant design consideration is the interface between the Gas Diffusion Layer (GDL) and the flow plate. With conventional flow plates 21, 22, such as for example arrangements those in which the flow fields are machined serpentine or parallel structures in a flow plate, the dominant reactant flow 24, 26 (flow shown generally with arrows) is in a direction parallel to the electrode surface. In this configuration 20, illustrated in FIG. 2, the reactant flow to the catalyst layer is predominantly by molecular diffusion through the GDL 4, 6. This can lead to large concentration gradients across the GDL and mass transfer limitations because of the small channel dimensions, laminar gas flow and the inherent slow molecular diffusion process.

Interdigitated flow plates 30, as shown in FIG. 3, provide convection velocity normal to the electrode surface for better mass transfer and enhanced water removal from the channels and GDL. This design employs flow plates 31, 32 with dead ended flow channels, which are not continuous from inlet manifold to exit, so that the reactant flow is forced under pressure to go through the GDL. This provides enhanced performance at high current density operation. However large pressure losses and high parasitic power (due to increased gas flow pressure) are characteristics of this type of flow field, which may limit this application to smaller stack sizes.

Open Pore Cellular Foam (OPCF) is a relatively new class of cellular material with the ability to be manufactured with tailored mechanical, thermal, acoustic and electrical properties by varying the material's relative density and cell morphology. OPCF material can provide great benefits to solve many engineering problems and at present it has many applications in filter systems, heat exchangers and more recently in the electrodes of some electrochemical devices; super capacitors, batteries and electrolysers.

As the name suggests these materials have an open pore structure composed of isotropic pores which are connected to each other by ligaments. The array of pores forms a solid homogonous matrix, having the same properties of the parent material but at the fraction of the weight. These materials are mainly manufactured by casting or foaming, leaving the final open pore foam material.

Porous Metal Foam (MF) & Reticulated Vitreous Carbon Foam (RVCF) materials are two common classes of OPCF. A variety of metals including; aluminium, copper, tin, zinc, nickel, silicon, stainless steels with high nickel or chrome content, silver and gold, can be made to produce an open pore MF. Advanced combinations can be achieved through secondary coating processes. RVCF is an OPCF material composed solely of vitreous carbon. As its name implies, vitreous carbon is a form of glass-like carbon that combines some glass properties with those of normal industrial carbons. The porosity of OPCF can be tailored and this gives the benefit that the use of metal foam may negate the need for an additional gas diffusion layer and also be used to support the catalyst in a region adjacent to the membrane and thus serve the purpose of an electrode.

Kumar and Reddy "Application of Metal Foam in the flow field Distributor of Polymer Electrolyte Membrane Fuel Cell Stack" Abs. 1060, 204th Meeting, 2003 The Electrochemical Society proposes a flow plate 40 in which metal foam 42 is placed in the flow channels, acting as electrodes, in place of the machined channels within the existing bipolar flow plate. In this arrangement, which is shown in FIG. 4, the central area 46 of the bipolar flow plate 44 is machined out or otherwise removed to form a recess in which metal foam is then placed. The representation of FIG. 4 is for a bipolar structure and hence the structure is replicated on opposing sides of the bipolar flow plate 44. Kumar and Reddy design consists of a bipolar flow plate 44, and this provides a separator or gas barrier between adjacent cells as shown in FIG. 4. Catalyst may be provided with the metal foam in regions adjacent to the membrane 2 such that the metal foam acts as an electrode. Thus in the construction shown there is metal foam 42, 43 provided on opposing sides of the membrane 2, in place of the machined channels within the existing bipolar flow plate. Whilst the use of foam in place of the machined channels offers advantages, the construction of Kumar and Reddy remains relatively bulky and heavy.

SUMMARY

The present application provides a fuel cell stack in which a region of metal foam is shared between two adjacent fuel cells thus negating the need for a flow\end plate which may act as a separator or gas barrier between the two adjacent cells. This is in contrast to Kumar and Reddy's proposal where the metal foam was inserted in place of the machined channels within the existing bipolar flow plate. Accordingly, a first embodiment of the application provides a membrane cell arrangement as detailed in claim 1. A second embodiment provides an arrangement in accordance with claim 11. A third embodiment provides an arrangement in accordance with claim 13. Advantageous embodiments are provided in the dependent claims.

BRIEF DESCRIPTION OF THE DRAWINGS

The present application will now be described with reference to the accompanying drawings in which.

DETAILED DESCRIPTION OF THE DRAWINGS

Figure 1:
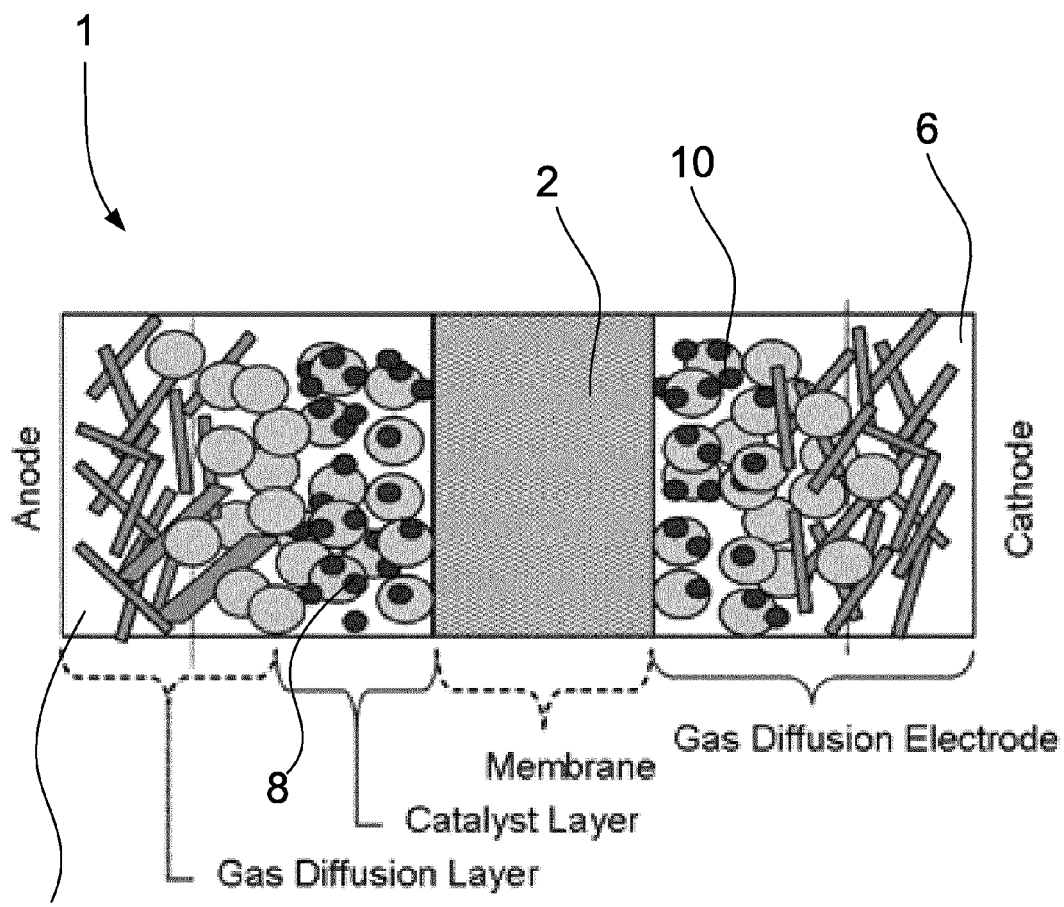
FIG. 1 is an example of a PEM fuel cell known in the art with the flow plate not shown.
Figure 2:
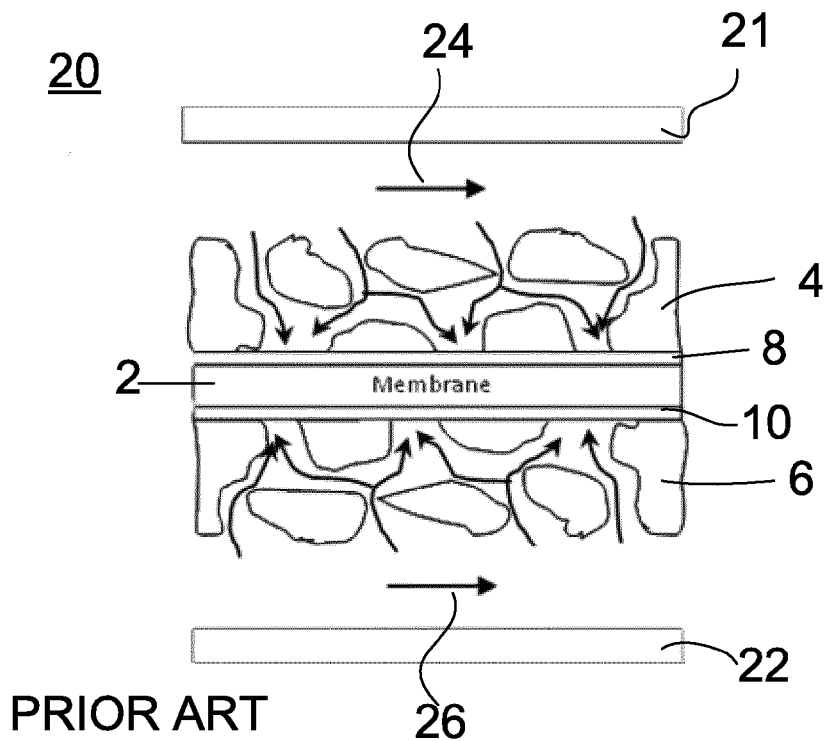
FIG. 2 is an example of the fuel cell of FIG. 1 with one type of flow plate.
Figure 3:
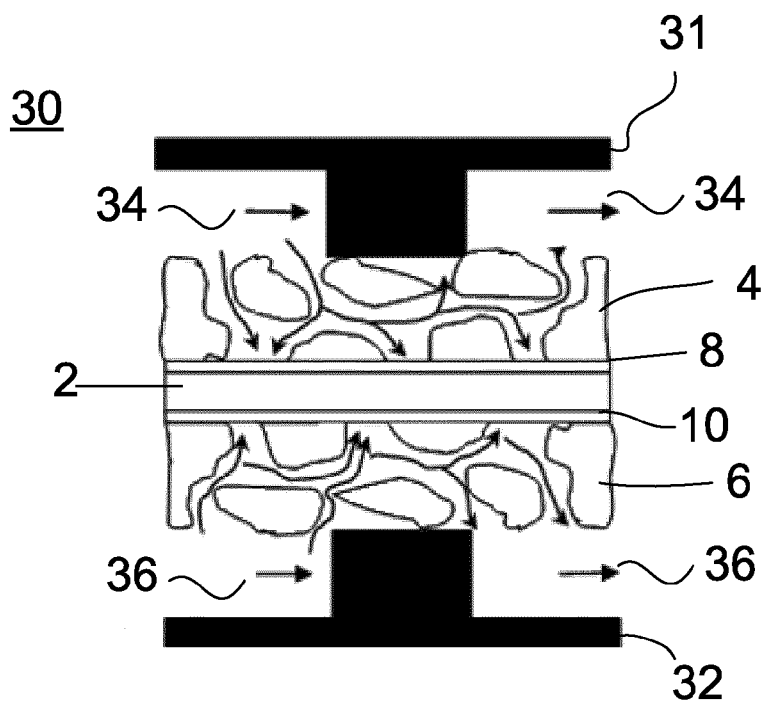
FIG. 3 is another example of the fuel cell of FIG. 1 with a different type of flow plate
Figure 4:
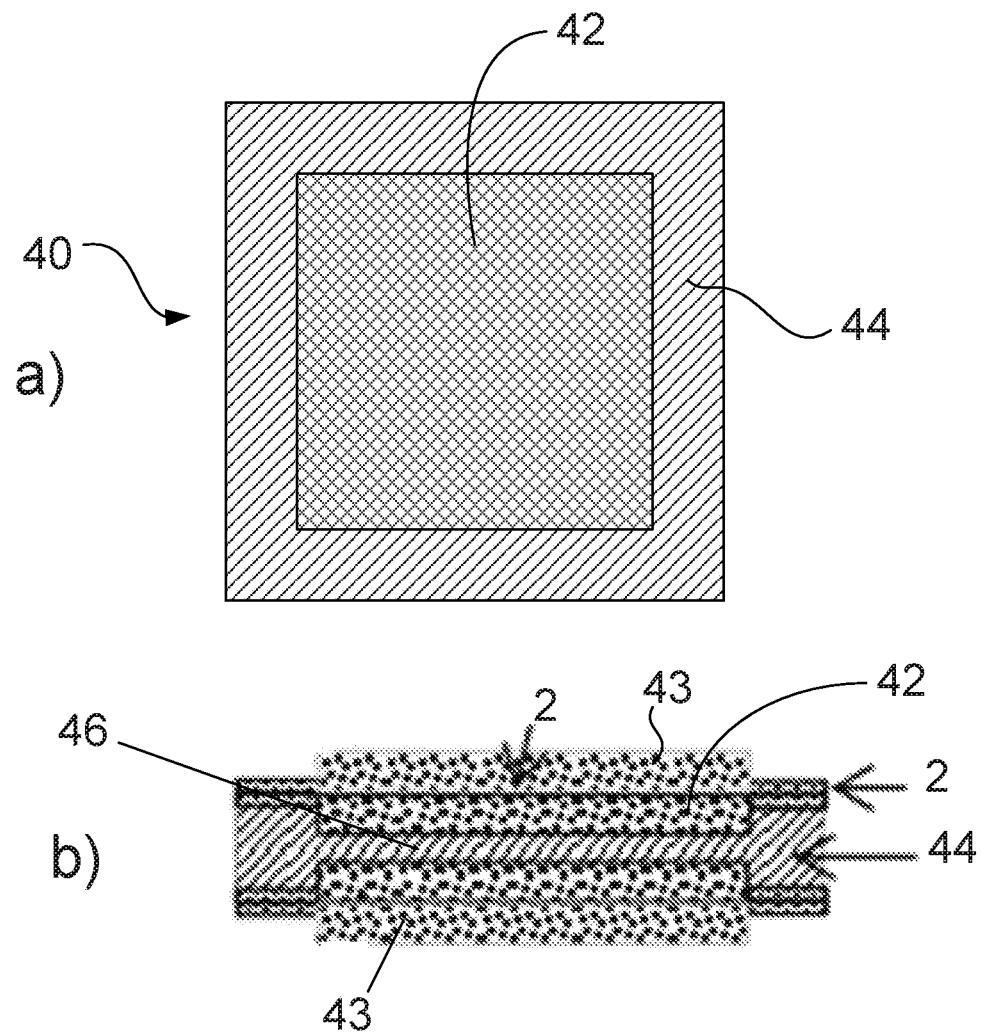
FIG. 4 is an example of an end plate known in the art.

The present application provides for a PEM fuel cell in which at least one of the flow plates in the fuel cell is a metal foam or, alternatively stated, a PEM fuel cell in which there is no end\flow plate as such and the gas diffusion layer may also be provided by an open pore cellular foam. It will be appreciated that there is no separator/gas barrier provided between the two fuel cells which share common Open Pore Cellular Foam (OPCF) flow manifolds. The metal foam provides a common fluid flow manifold between adjacent fuel cells with no separator/gas barrier provided. The extremities of the common fluid flow manifold, which is made solely of metal foam, may also be tailored to replace a gas diffusion layer so as to reduce the number of components in a cell. Thus, in addition the Gas Diffusion Layer (GDL) may also be provided by an OPCF and may negate the necessity of a conventional Gas Diffusion Layer (GDL). In addition the electro-catalyst may be therefore deposited directly onto the OPCF and negate the necessity of a separate electro-catalyst layer. It will be appreciated that such a construction which removes the need for a separator/gas barrier is significantly simpler to manufacture and lighter in weight compared to a conventional fuel cell. Thus a fuel cell of the present application is distinguished from the fuel cells of Reddy and Kumar by the absence of a metal plate or separator/gas barrier on at least one end of the fuel cell or fuel cell stack. This is achieved by the metal foam being shared between two adjacent cells.

The present application will now be described with reference to exemplary aspects illustrated in the drawings. In a first aspect, shown in FIG. 5, two fuel cells 100, 101 are provided. Each fuel cell comprises a membrane 102 which is a suitable proton conducting electrolyte. Catalyst layers 108, 110 are provided on each side of the membrane. Open Pore Cellular Foam (OPCF) flow manifolds 104, 106 are provided in place of conventional flow plates to provide a flow of fuel 112, 114 (e.g. hydrogen or oxidant) to the respective catalyst layers and to allow for the removal of waste by product e.g. water (not shown). It will be appreciated that there is no separator/gas barrier provided between the two fuel cells which share common Open Pore Cellular Foam (OPCF) flow manifolds.

Open Pore Cellular Foam (OPCF) materials reduce the permeability of the gas flow through the flow manifold. This permeability reduction with the conventional machined channel design is not possible beyond a particular value (around $10^{-8}$ m$^2$), due to difficulty in machining thin cross-section channels. This is not an issue for OPCF materials with a measured permeability of $10^{-8}$ m$^2$ for 40 ppi foam for example; with the added benefit of low pressure drop from inlet to outlet, even at high flow rates. Additionally, the metal foam may be constructed in a way such that there is a pore diameter change from regions adjacent the membrane and those further away from the membrane. A metal foam may be partially compressed to adjust the porosity in one or more regions.

It will be appreciated that there is no end plate provided between the two fuel cells which share a common metal foam layer. They also share a common electrical connection. The foam flow manifolds are constructed from a conductive Open Pore Cellular Foam (OPCF) cut to a suitable shape to fit within an outer enclosure or frame (FIG. 6) with the active surface the same area as the area of the MEA (membrane electrode assembly) active surface. The outer enclosure suitably provides an electrical connection (current collector) from the metal foam to the external circuit and provides suitable inlet for the fuel/oxidant with respective outlets. The conductive OPCF flow manifold, that allows flow of the oxygen to the cathode and a hydrogen containing fuel to the anode, has at least one input orifice and at least one output orifice. The design of the flow manifold is such that it allows effective flow of the fluids to the electro-catalysts of the anode or cathode, supports the cell and enables a conductive path from the anode or cathode of the conductive OPCF to the current collector tap 134, to the external circuit.

The conductive open pore cellular foam (OPCF) suitably should have an adequate porosity to maximise the convective flow of fuel and oxidant, minimise resistance and minimise pressure drop between the inlet and outlet. A suitable value of porosity may be between 10 ppi (pores per inch) and 60 ppi, preferably between 10 ppi (pores per inch) and 50 ppi. The thickness of the conductive open pore cellular foam (OPCF) is selected to be a suitable thickness to maximise the convective flow of fuel and oxidant, minimise resistance and minimise pressure drop between the inlet and outlet. A suitable thickness may be between 1 mm and 5 mm, preferably between 1 mm and 3 mm.

Figure 6:
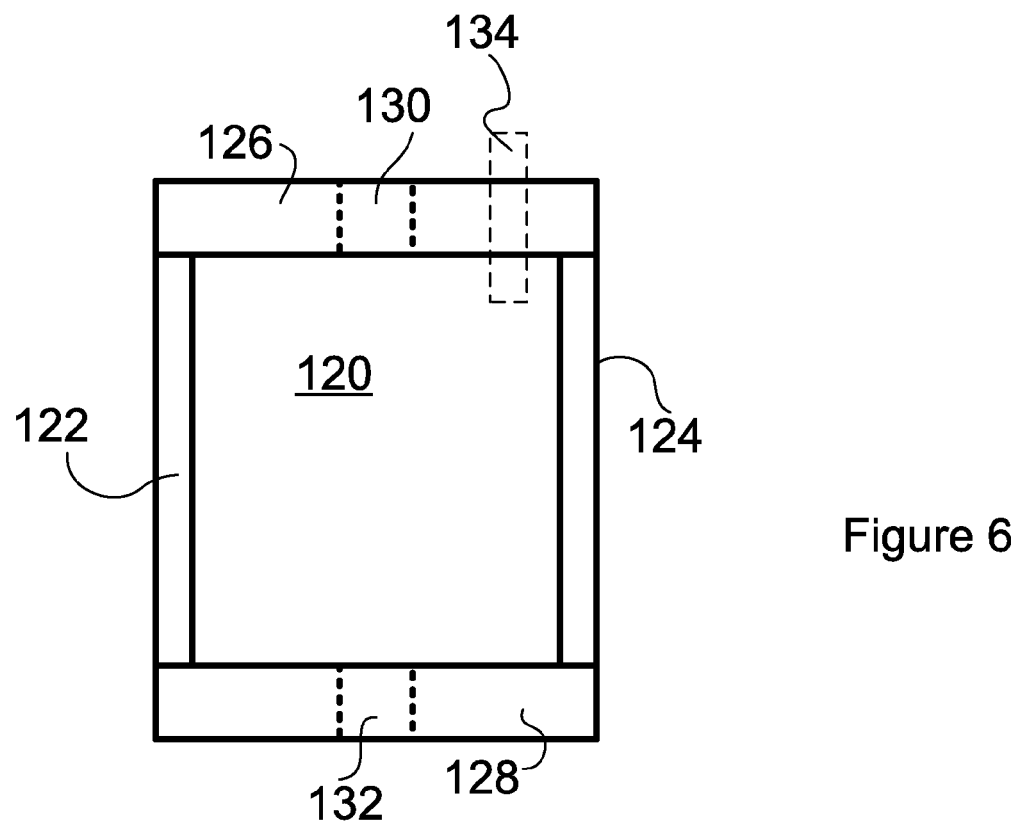
FIG. 6 is a cross sectional view of a region of metal foam according to a second aspect provided by the present application.

The edges of the conductive OPCF (open pore cellular foam) are sealed by a frame 126, 128 as shown in FIG. 6. The frame surrounds the OPCF to avoid the risk of fluid leaks from the fuel cell or stack. Suitable gasketing (not shown) should be provided between the individual cell frames within the fuel cell or fuel cell stack to avoid the risk of fluid leaks or electrical shorts from the fuel cell or fuel cell stack. The current collector should be attached to it to allow conduction of electricity.

Within the frame suitable inlet(s) 130 may be provided through which fuel\oxidant may be introduced to the metal foam. Equally, suitable outlet(s) 132 may be provided for removing excess fuel \oxidant and the resulting by products, e.g. water. An advantage of this approach is that relatively inexpensive techniques may be employed to construct the fuel\oxidant delivery means, in contrast to prior art which generally required complex and expensive metal machining techniques.

In one aspect, the fluid connection may be for example by means of a soldered or similar connection to a metal conductor 122, 124 beside the side of the metal foam with another material, for example a lightweight insulating material, for example a plastics material providing an interface\wall 126, 128 at the top and bottom. Thus for example a suitable channel 130 may be provided in the top through which fuel\oxidant may be introduced to the metal foam. Equally, an outlet 132 may be provided for removing excess fuel \oxidant and the resulting by products, e.g. water. An advantage of this approach is that relatively inexpensive techniques may be employed to construct the fuel \oxidant delivery means in contrast to prior art which generally required complex and expensive metal machining techniques.

The conductive OPCF (open pore cellular foam) flow manifold, if constructed from a metallic material, should have a protective coating such as an oxide layer or anodised or other surface protection as to prevent corrosion of the conductive OPCF (open pore cellular foam) ligaments in service. In this arrangement, the contact point or points on the current collector tap 134 are preferably not coated by the protective layer or coating. Similarly, the active face of the conductive OPCF (open pore cellular foam) (the anode or cathode face of the conductive OPCF in contact with the MEA) is desirably not coated by the protective layer or coating, as to allow free flow of electrons from the anode or cathode to the external circuit. The cathode and anode face of the conductive OPCF flow manifold, which will be in contact with the membrane, may be coated with a suitable surface that allows for ease of electrical connection.

It is understood for example, as shown in FIG. 6, that a section of metal foam 120 may be provided with an electrical connection to one side 122 or both sides 122, 124. This connection may be for example by means of a soldered, brazed, welded, screwed or similar connection to the metal foam 120.

In another variation, the frame surrounding the OPCF may be insulative (items 122, 124, 126, 128 may be insulative and not connected to the OPCF), made of lightweight polymer or similar material, with an electrical connection or tab 134, (connected to the OPCF for example by means of a soldered, brazed, welded, screwed or similar), protruding through the frame for connection to an external circuit. Suitable gasketing (not shown) should be provided between the tab and the frame, to avoid the risk of fluid leaks or electrical shorts from the fuel cell or fuel cell stack.

In another further variation, the frame surrounding the OPCF may be conductive (items 122, 124, 126, 128 may be conductive and connected to the OPCF) and a connection made to the OPCF for example by means of a soldered, brazed, welded, screwed or similar connection with an electrical connection or tab 134 protruding from the conductive frame for connection to an external circuit. Suitable gasketing (not shown) should be provided between the individual cell frames within the fuel cell or fuel cell stack to avoid the risk of fluid leaks or electrical shorts from the fuel cell or fuel cell stack.

It is noted that a suitable framing option may be a either a conductive frame or an insulative frame or a mix of both as shown in FIG. 6.

It is noted that OPCF may be constructed or tailored in a way such that there is a pore diameter change from region to region. Therefore a single piece of foam can be treated to adjust the porosity in one or more regions or to have a gradient of pore sizes across its thickness. If the porosity of the OPCF flow manifold is tailored across its thickness, small pores on the outside (regions adjacent the membrane) and large pores in the centre (fluid flow region, further away from the membrane), this may allow a single metal foam piece of OPCF to have different layers in the foam treated differently to provide the necessary characteristics inside the fuel cell or fuel cell stack.

In this arrangement the fluid flow is provided by the conductive OPCF with appropriate pore size in the centre of the foam that can carry the necessary fluid (e.g. hydrogen or oxidant) to the cathode and anode face of the conductive OPCF flow manifold that will be in contact with the membrane of the fuel cell and carry water out of the fuel cell. Additionally, the GDL may be provided by the same conductive OPCF but with appropriate pore size on the outside (cathode and anode face of the conductive OPCF flow manifold that will be in contact with the membrane) applied to the foam to form the GDL and thus may negate the need for a conventional, additional, GDL.

In one arrangement the catalyst layers are similarly provided by conductive open pore cellular foam. In this arrangement, the same open pore cellular foam may be employed but with appropriate electro-catalyst applied to the foam to form the catalyst layer. The electro-catalyst layers may be provided or the OPCF act as a support by the same conductive OPCF with appropriate electro-catalyst applied to the foam to form the electro-catalyst layer. It will be appreciated therefore that each catalyst layer/Gas Distribution Layer (GDL) combination may be formed on or form part of a single metal foam piece with different layers in the foam treated differently to provide the necessary characteristics.

Figure 5:
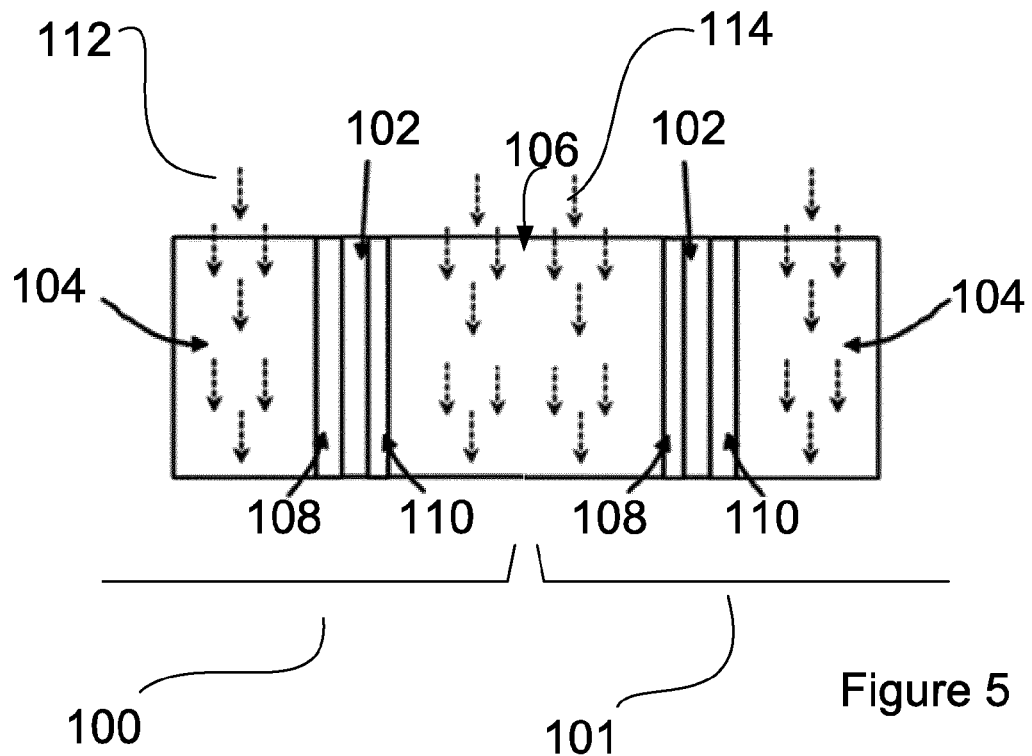
FIG. 5 is a representation of a first aspect provided by the present application.

With reference to FIG. 5, the proton conducting electrolyte 102 is sandwiched between the OPCF flow manifold 104,106 which has the electro-catalyst applied in regions

108,110 adjacent the electrolyte. The outer pores of the conductive OPCF flow manifold should be hydrophobic and the central pores should be hydrophilic to ensure the traverse of liquid water, if present, towards the outlet.

The electro-catalyst may be deposited by any suitable printing, painting, deposition, coating or blasting process. In one variation, a hydrophobic agent is deposited onto the cathode and anode face of the conductive OPCF flow manifold that will be in contact with the membrane. The hydrophobic agent acts to repel water from the active electro-catalyst sites and move it to the output orifice/s. It will be understood that the application of the hydrophobic agent should be performed so as not to block access/expulsion of fluid (e.g. hydrogen or oxidant or water) through the conductive OPCF. The electro-catalyst may then be deposited by any suitable printing, painting, deposition, coating or blasting process, on one or both (bipolar) cathode and anode face of the conductive OPCF flow manifold that will be in contact with the membrane. A pre-treatment process or the application of the electro-catalyst may be employed to remove any metal oxide layer if present on the foam to increase conductivity and reduce resistance losses within the fuel cell or fuel cell stack.

It is understood that the electro-catalyst and/or any additional constituents of the electro-catalyst or support for the electro-catalyst such as binders or carbon and/or hydrophobic agent may be applied either together or separately or in sequence to the OPCF by any suitable printing, painting, deposition, coating or blasting process. The suitable printing, painting, deposition, coating or blasting process, can deposit the hydrophobic agent and the electro-catalyst together if possible. A conductive path should be formed between the electro-catalyst layer to the current collector tap with minimal resistance.

It is noted that in the stated configuration the required quantity of fuel cells (comprising of proton conducting electrolytes and OPCF flow manifolds) are connected to acquire suitable power. Whilst the arrangement of FIG. 5 has been shown with respect to just two fuel cells, it will be appreciated that the arrangement may be repeated so as to form a stack. It will be appreciated that an enclosure will be required about the stack and similarly about the ends to contain the fuel and oxidant.

It will be understood that if the arrangement of FIG. 5 is repeated throughout a stack that the effective output voltage will be per individual fuel cell. The fuel cell stack will be in parallel configuration. This configuration has benefits that includes reduced chance of single point failure over series configuration fuel cell stack.

This voltage is useful for example in low voltage electronic circuits such as those employed in portable electronic devices. Equally, power conversion circuits may be employed to switch the voltage to a higher voltage. Similarly, by inserting an insulating layer between one or more fuel cells, a higher output voltage may be achieved by appropriate electrical connection.

A significant advantage still results in that there is no requirement for a metal end plate as the electrical connections may be made to the side of the metal foam. Thus a lightweight insulating material may be used as an end plate or indeed as an insulator between adjacent fuel cells.

It will be understood that, in one configuration, in which the individual fuels cells are arranged in a loop, e.g. a circular fashion such that the first cell in the stack is adjacent to the last cell in the stack, or where cells are arranged in concentric rings around a central core, the need for end plates may be obviated entirely. It will be appreciated that in this configuration, adjacent fuel cells may not have a common gas distribution layer but instead each cell may be insulated from adjacent cells in the stack by an insulating layer and hence the need for a metal end plate is equally obviated.

It will be understood that PEM fuel cells have an optimal operating temperature range that must be maintained for optimal performance. In one configuration hollow tubes may be inserted through the frame and the OPCF to provide fluid passage for temperature control of the fuel cell or fuel cell stack. Suitable gasketing should be provided between tubes and cell frames within the fuel cell or fuel cell stack to avoid the risk of fluid leaks or electrical shorts from the fuel cell or fuel cell stack.

In another configuration, cooling fins may be added to the frame 122,124, if part or all, of the frame is made of a thermal conductive material to provide temperature control of the fuel cell or fuel cell stack. This option may be cooled/heated passively (radiation & convection) or actively by moving air currents.

In another configuration, a combination of hollow tubes and cooling fins may be utilised, actively or passively to provide fluid passage for temperature control of the fuel cell or fuel cell stack.

It will be understood that whilst the present application has been described with reference to a fuel cell arrangement, that the structure employing a metal foam is not so limited and thus the arrangement may be used in other configurations and devices. For example, it will be appreciated that the same construction may be employed to provide an electrolyser except that water is provided to the device along with current and the by products produced are hydrogen and oxygen. The arrangement may also be employed with electrochemical sensors. Thus references to fuel cells above may be taken to extend to any general membrane type arrangement employing a metal foam including for example but particularly electrolysers.

The words comprises/comprising when used in this specification are to specify the presence of stated features, integers, steps or components but does not preclude the presence or addition of one or more other features, integers, steps, components or groups thereof.

The invention claimed is:

1. A membrane cell arrangement comprising two adjacent cells wherein the two cells share a common fluid flow manifold, the fluid flow manifold comprising a region of metal foam, wherein the region of metal foam is shared between the two adjacent cells.

2. The arrangement of claim 1, wherein the two cells are PEM cell structures.

3. The arrangement of claim 1, wherein electro-catalyst is applied to a region of the metal foam to form a catalyst layer.

4. The arrangement of claim 1 wherein a hydrophobic agent is provided on the surface of the pores in a region of the metal foam close to the membrane.

5. The arrangement of claim 4 wherein a hydrophilic agent is provided on the surface of the pores in a further region of the metal foam further away from the membrane.

6. A stack comprising a plurality of the membrane cell arrangements of claim 1.

7. The arrangement of claim 1 wherein the at least two adjacent cells are fuel cells.

8. The arrangement according to claim 7, wherein the arrangement is a fuel cell.

9. The arrangement according to claim 1, wherein the at least two adjacent cells are electrolysers.

10. The arrangement according to claim 1, wherein at least one region of the metal foam is modified to form a gas diffusion layer.

11. The arrangement of claim 1, further comprising:
a frame surrounding at least one of the two adjacent cells; and
at least one hollow tube inserted through the frame and the metal foam to provide passage for a temperature control fluid.

12. A stack of proton exchange membrane cells, the stack comprising:
a first Proton Exchange Membrane cell comprising a first proton exchange membrane sandwiched between a first anode and a first cathode; and
a second Proton Exchange Membrane cell comprising a second proton exchange membrane sandwiched between a second anode and a second cathode, wherein the first Proton Exchange Membrane cell and the second Proton Exchange Membrane cell are adjacent to one another and where either the first and second anodes or the first and second cathodes are formed by a common region of metal foam shared between the first Proton Exchange Membrane cell and the second Proton Exchange Membrane cell.

13. The stack of claim 12, further comprising electrocatalyst formed on a region of the metal foam.

14. The stack of claim 12, wherein a hydrophobic agent is provided on the surface of the pores in a region of the metal foam.

15. The stack of claim 14, wherein a hydrophilic agent is provided on the surface of the pores in a further region of the metal foam.

16. The stack of claim 12, wherein the stack is a fuel cell stack, the stack further comprising a first gas supply providing a first gas to each of the first and second Proton Exchange Membrane cells, wherein the first gas supply is directed into each of the first and second Proton Exchange Membrane cell through the common region of metal foam.

17. The stack of claim 12, wherein the metal foam is an Open Pore Cellular Foam.

18. The stack of claim 12, wherein the metal foam pore diameter within the metal foam increases from regions adjacent the membrane and those further away from the membrane.

19. The stack of claim 12, further comprising an inlet for directing a fuel or oxidant into the common region of metal foam in a direction transverse to a longitudinal axis along which the first and second cells are disposed.

20. The stack of claim 19, further comprising an outlet disposed opposite the inlet for receiving a by-product.

21. The stack of claim 20, further comprising an electrical connection provided to the metal foam, wherein the electrical connection is provided to a surface of the metal foam positioned between the inlet and outlet.

22. The stack of claim 12, wherein the stack is an electrolyser stack.

23. The stack of claim 12, further comprising:
a frame surrounding at least one of the cells; and
at least one hollow tube inserted through the frame and the metal foam to provide passage for a temperature control fluid.

24. A stack of proton exchange membrane cells, the stack comprising:
a plurality of Proton Exchange Membrane cells, each cell of the plurality comprising an anode and cathode region separated by a proton exchange membrane,
wherein the anode is shared with the anode of an adjacent cell and where the anode is provided by a metal foam and the cathode of each cell is shared with the cathode of an adjacent cell and where the cathodes are provided by a metal foam.

25. A stack according to claim 24, wherein the individual anodes and cathodes of the stack are connected in parallel so that a redundant configuration is established.

26. A stack according to claim 24, further comprising a first membrane cell and a second membrane cell wherein the plurality of cells are positioned between the first cell and the second cell and where the stack further comprises end plate on opposite ends of the stack.

27. A stack according to claim 24, wherein the stack is formed in an annular or circular form without end plates.

* * * * *